United States Patent [19]

Markofsky

[11] 3,900,423

[45] Aug. 19, 1975

[54] PROCESS FOR BREAKING EMULSIONS

[75] Inventor: Sheldon B. Markofsky, Silver Spring, Md.

[73] Assignee: W. R. Grace & Co., New York, N.Y.

[22] Filed: Mar. 28, 1973

[21] Appl. No.: 345,775

[52] U.S. Cl............ 252/344; 252/358; 260/583 DD; 260/583 P
[51] Int. Cl.² ........................................ B01D 17/04
[58] Field of Search...... 252/344, 358; 260/583 DD, 260/583 P

[56] References Cited
UNITED STATES PATENTS

| | | | |
|---|---|---|---|
| 2,819,223 | 1/1958 | De Groote et al. | 252/344 |
| 3,126,313 | 3/1964 | Johnson | 252/358 X |
| 3,205,169 | 9/1965 | Kirkpatrick et al. | 252/344 X |
| 3,304,349 | 2/1967 | Shen | 252/358 X |

*Primary Examiner*—Richard D. Lovering
*Attorney, Agent, or Firm*—Elton Fisher

[57] ABSTRACT

A process for breaking an oil-in-water or a water-in-oil emulsion in which the emulsion is treated with a demulsifier to break the emulsion; the demulsifier is prepared by reacting in an aqueous system; (a) ammonia or a primary amine; (b) a secondary amine; and (c) epihalohydrin or a dihalohydrin.

14 Claims, No Drawings

PROCESS FOR BREAKING EMULSIONS

BACKGROUND OF THE INVENTION

This invention is in the field of emulsions. More particularly it is in the field of oil-in-water emulsions. Even more particularly said invention is directed to a process for breaking (demulsifying) such emulsions.

The following U.S. Pat. No. teach methods for demulsifying emulsions comprising oil and water: 3,166,516 (Kirkpatrick et al., 252/344); 3,205,169 (Kirkpatrick et al., 252/8.55); 3,272,757 (Kirkpatrick et al., 252/344); 3,528,928 (Rushton 252/341); 3,557,017 (Mange et al 252/339); 3,617,571 (Mange et al 210/54); 3,640,894 (Sampson 252/344);

SUMMARY OF THE INVENTION

In Summary, this invention is directed to a process for demulsifying a water-in-oil or an oil-in-water emulsion which comprises subjecting the emulsion to the demulsifying action of an effective amount for demulsifying the emulsion of a demulsifying composition and separating the resulting oil and water phases, the demulsifying composition being formed by:

a. admixing (i) a member selected from a first group consisting of ammonia, a primary alkylamine having 1–25 (preferably 4–12) carbon atoms per molecule, and an alkylenepolyamine having 4–25 (preferably 4–12) carbon atoms per molecule and at least 1 (preferably 1–6) primary amino group(s) per molecule; (ii) a member selected from a second group consisting of a secondary alkyl amine having 2–12 (preferably 2–8) carbon atoms and at least 1 (and preferably 1–6) secondary amino group per molecule and a secondary alkylenepolyamine having 3–50 (preferably 3–28) carbon atoms per molecule and at least 1 (preferably 2–15) secondary amino groups per molecule; (iii) a member selected from a third group consisting of an epihalohydrin (e.g., epichlorohydrin or epibromohydrin, and preferably epichlorohydrin) and a dihalohydrin having 3–20 (preferably 3–10) carbon atoms per molecule; and (iv) water to form a mixture, the equivalent ratio of third group member to first group member being 1:0.009–0.5 (preferably 1:0.02–0.5) and the equivalent ratio of third group member to first group member plus second group member being 1:0.22–1.3 (preferably 1:0.25–1) and the mole ratio of third group member to water being 1:1–100 (preferably 1:2–50); and b. maintaining the mixture at 25–125°C (preferably 35°–100°C) until its viscosity becomes 20–20,000 (preferably 20–10,000) centipoises to form an aqueous solution of said demulsifying composition; if desired caustic soda or caustic potash can be added to the mixture to increase pH and reaction rate. If desired additional water can be added during or after reaction to reduce the viscosity of the solution of demulsifying composition; such water can be added continuously during reaction, as increments during reaction, as one or two or more batches during reaction, or, as noted supra, it (the water) can be added after the reaction has been completed. If desired acid can be added when the reaction has proceded to a predetermined extent to lower the pH and to terminate reaction. If acid is not added the product (an aqueous solution of the demulsifying composition) generally has a pH of about 5–8 depending on; (a) the ratio of reactants used; (b) whether or not caustic was added during reaction; and (c) the amount of water present in the solution. The viscosity of the final product (an aqueous solution of the demulsifying composition) will vary depending on the average molecular weight of the reaction product in the resulting solution and on the ratio of such product to the water component of said resulting solution. A pH within the range of 1–7.5 (preferably 3.5–7) is generally preferred in the final solution (the solution of demulsifying composition).

DESCRIPTION OF PREFERRED EMBODIMENTS

In preferred embodiments of the process of the above Summary:

1. The first group member is dimethylaminopropylamine and the equivalent ratio of second group member to first group member is 1:0.09–0.11.

2. The secondary alkyl amine having 2–50 carbon atoms and at least one secondary amino group per molecule is dimethylamine and the equivalent ratio of second group member to dimethylamine is 1:0.45–0.55.

3. The mixture is maintained at 60°–65°C to form the demulsifying composition.

4. The pH of the mixture is adjusted to 3.5–6.5 to form the demulsifying composition.

5. Water is added to the demulsifying composition to adjust the viscosity to 5–2000 centipoises before subjecting the emulsion to the action of the demulsifying agent.

6. The oil component of the emulsion is a petroleum oil.

7. The oil component of the emulsion is naturally occurring petroleum oil which is also known as "crude oil."

8. The water component of the emulsion is naturally occurring water or the water component of a naturally occurring brine.

9. The emulsion is a water-in-oil emulsion.

10. The emulsion is an oil-in-water emulsion.

In another preferred embodiment ("Embodiment A") this invention is directed to a process for breaking an oil-in-water emulsion or a water-in-oil emulsion which comprises admixing with the emulsion an aqueous solution of a condensate of an epihalohydrin (preferably epichlorohydrin or epibromohydrin) or a dihalohydrin having 3–20 (preferably 3–10) carbon atoms per molecule and; (a) a member selected from the group consisting of ammonia, a primary alkylamine having 1–25 (preferably 4–12) carbon atoms per molecule, and an alkylenepolyamine having 4–25 (preferably 4–12) carbon atoms per molecule and at least 1 (preferably 1–6) primary amino group(s) per molecule; and (b) a secondary alkyl amine having 2–12 carbon atoms per molecule or a secondary alkylenepolyamine having 3–50 (preferably 3–8) carbon atoms and at least 1 secondary amino group per molecule, and resolving the broken emulsion into its oil and water phases, said condensate being supplied and admixed in an amount effective for breaking the emulsion.

In an especially preferred embodiment of the invention as set forth in Embodiment A, supra, the group member is dimethylaminopropylamine, and the secondary alkyl amine having 2–12 carbon atoms molecule is dimethylamine, and the epihalohydrin is epichlorohydrin.

In another preferred embodiment this invention is directed to a process for demulsifying an aqueous emulsion selected from a first group consisting of a water-inoil and an oil-in-water emulsion which comprises subjecting the emulsion to the demulsifying action of a demulsifying composition formed by admixing and reacting in an aqueous system; (a) an epihalohydrin or a dihalohydrin; (b) a member selected from a second group consisting of ammonia, a primary alkylamine, and an alkylenepolyamine having at least one primary amino group per molecule; and (c) a secondary alkylamine or a secondary alkylenepolyamine, and separating the resulting oil and water phases of the broken aqueous emulsion, the demulsifying composition being present in an amount effective for breaking the aqueous emulsion.

DETAILED DESCRIPTION OF THE INVENTION

This invention is directed to a process for breaking water-in-oil emulsions—especially water-in-mineral oil emulsions including petroleum emulsions commonly encountered in the production, handling and refining of crude mineral oil (petroleum).

This invention is also directed to a process for breaking oil-in-water emulsions including mineral oil-in-water emulsions such as petroleum emulsions commonly encountered in the production, handling, and refining crude mineral oil.

This invention is also directed to breaking oil-in-water and water-in-oil type emulsions which are produced artificially or naturally.

The presence of such emulsion often present problems of resolution, recovery, or disposal.

Petroleum emulsions are frequently of the water-in-oil type wherein the oil acts as a continuous phase for the dispersal of finely-divided particles of naturally occurring water or brines. These emulsions are often extremely stable and will not resolve (break or separate) on long standing.

Water-in-oil type emulsions frequently occur artificially resulting from any one or more of numerous operations encountered in various industries. The emulsions obtained from producing wells and from the bottom of crude oil storage tanks are commonly referred to as "cut oil," "emulsified oil," "bottom settlings," and "B.S."

In the process of this invention an aqueous emulsion (oil-in-water type or water-in-oil type) is admixed with an aqueous solution of a demulsifying composition (a demulsifier) prepared by a process comprising admixing and reacting in an aqueous system; (a) an epihalohydrine (e.g., epichlorohydrin or epibromohydrin) or a dihalohydrin; (b) a member selected from a group consisting of ammonia, a primary alkylamine, and an alkylenepolyamine having at least one primary amino group per molecule; and (c) a secondary alkylamine or a secondary alkylenepolyamine preferably having 2–12 or 2–8 carbon atoms per molecule and preferably having 1–6 secondary amino groups per molecule, and separating the resulting oil and water phases of the broken water-in-oil or oil-in-water emulsion.

The instant invention will be better understood by referring to the following specific but nonlimiting examples. It is understood that said invention is not limited by said examples which are offered merely as illustrations; it is also understood that modifications can be made without departing from the spirit and scope of the invention.

EXAMPLE 1

A demulsifying composition for use in the process of this invention was prepared by the following procedure.

A 10.2 gram (0.1 mole or 0.2 equivalents) portion of dimethylaminopropylamine and a 112.5 g portion of an aqueous 40% dimethylamine solution (1 mole, i.e., 1 equivalent of the dimethylamine) were admixed in a 500 ml glass reaction zone provided with a thermometer, a condenser, and an addition funnel. The mixture in the reaction zone was cooled and 102 g (1.1 mole or 2.2 equivalents) of epichlorohydrin was added to the reaction zone over a period of about 10–15 minutes while stirring the resulting mixture in the reaction zone and while maintaining said mixture within a temperature range of 30°–35°C by cooling said mixture. Cooling was necessary because the reaction between the epichlorohydrin and the amines was exothermic. After all of the epichorohydrin had been added the exotherm subsided and the material in the reaction zone was heated to 60°–65°C and maintained within this temperature range while stirring and adding 300 ml of water thereto at a rate of 65 ml per hour. After all of the water had been added the resulting mixture was stirred for another 2 hours while maintaining the temperature thereof at 60°–65°C. The resulting mixture was then cooled to 25°C and a first sample was taken for testing. The pH of the first sample was found to be 6.3 and its viscosity was found to be 75 centipoises. Said sample had a solid content of 31.4%.

After standing for 3 days at room temperature (ca. 22°–28°C) the viscosity of the resulting mixture had increased to 150. Accordingly, dilute (6 normal) sulfuric acid solution was added thereto to bring the pH to 3.2 to terminate further reaction and stabilize the product. The thus stabilized product (which contained 69% water) was designated "Demulsifier No. 1A."

The above general procedure was repeated in 4 replications. However said procedure was modified by replacing the epichlorohydrin with an equivalent quantity (1.1 mole, or 2.2 equivalents) of the materials listed in Table I.

TABLE I

| Replication No. | Epichlorohydrin Replaced With | Product Designated |
|---|---|---|
| 1 | Epibromohydrin | Demulsifier No. 1B |
| 2 | α-Dichlorohydrin | Demulsifier No. 1C |
| 3 | 2,3-Dichloro-1-butanol | Demulsifier No. 1D |
| 4 | 1,3-Dihcloro-2-pentanol | Demulsifier No. 1E |

EXAMPLE 2

Ten batches of water-in-oil emulsion were prepared by admixing, in each instance, 150 g of a non-detergent motor oil (Zayer's Premium Motor Oil SB-MM) with 15 g of water in a Waring Blender set on its highest mixing speed. Mixing time was 1 minute. The ten batches of emulsion were combined and admixed to prepare a composite which was designated "Emulsion 2A." Each batch was prepared at ca. 25°C.

EXAMPLE 3

Each of six 25 ml graduated cylinders (the "glass stopper type") was filled to the 25 ml mark with Emulsion 2A. The first cylinder was set aside as a control while the emulsion in each of the other graduated cylinders was treated with a predetermined quantity of Demulsifier No. 1A (the demulsifier prepared in Example 1). The demulsifier was added as an aqueous solution which contained $5 \times 10^{-2}$ g (0.05 g) of demulsifier per ml. To keep all tests comperable, sufficient extra water was added to each graduated cylinder so that the total volume of added material (demulsifier solution plus extra water) was 0.5 ml. Obviously no extra water was required Run Run No. 6, and 0.5 ml of extra water was required in the control (Run No. 1). All runs were made at 25°C.

The following table shows the test conditions and results of these runs.

EXAMPLE 5

The general precedure of Example 3 was repeated. However, in the 6 runs of this example (Example 5) Emulsion 2A was replaced with Emulsion 4A. In each run (except Run No. 1, the control in which no demulsifier was added) the oil-in-water emulsion broke within 3 hours and it (the emulsion) (separated) into two phases; (a) a clear (haze free) aqueous phase; and (b) a film of oil floating on top of the haze free aqueous phase.

A number of runs were made in which the general procedure of Example 1 was repeated; however in these runs the following modifications were made in the procedure of said Example 1:

1. Hydrochloric acid was used in place of sulfuric acid.

TABLE II

| Run No. | Graduated Cylinder No. | Demulsifier No. 1A, ppm[2] | Emulsion Breaking Tests[1] Ml Aqueous Demulsifier System Added | Extra Water Added, Ml[3] | Water Separated, Ml | Appearance of Separated Water Layer |
| --- | --- | --- | --- | --- | --- | --- |
| 1 | 1 | None (Control) | None | 0.5 | 2.0 | Very Hazy |
| 2 | 2 | 200 Demulsifier No. 1A | 0.1 | 0.4 | 1.8 | Clear[4] |
| 3 | 3 | 400 Demulsifier No. 1A | 0.2 | 0.3 | 2.0 | Clear[4] |
| 4 | 4 | 600 Demulsifier No. 1A | 0.3 | 0.2 | 2.2 | Clear[4] |
| 5 | 5 | 800 Demulsifier No. 1A | 0.4 | 0.1 | 2.5 | Clear[4] |
| 6 | 6 | 1000 Demulsifier No. 1A | 0.5 | None | 2.1 | Clear[4] |

[1]All runs were made at 25°C, and all readings were made 24 hours after adding the demulsifier.
[2]Parts by weight of Demulsifier No. 1A per million parts by volume of emulsion (not including the water in which the demulsifier was dissolved and not including the extra water added).
[3]This water was added to keep the total volume of water added comperable in all runs.
[4]The fact that the separated water layer was clear means that said layer was substantially free of oil.

Similar results were obtained when a water-in-oil emulsion prepared from fuel oil was subjected to the procedure of Example 3.

The general procedure of Example 3 was repeated at 5°, 10°, 15°, 35°, 45°, 55°, 65°, 70°, 80° and 95°C and the results obtained were substantially identical with those obtained in Example 3. At higher temperatures a pressure system can be used to obtain similar results.

The general procedure of Example 3 was repeated in 4 additional replications (each replication comprising 6 runs including a control run) using the following demulsifiers; (a) Demulsifier No. 1B; (b) Demulsifier No. 1C; (c) Demulsifier No. 1D; and (d) Demulsifier No. 1E rather than Demulsifier No. 1A which was used in Example 3. In each replication the results were substantially the same as those reported in Table II, supra.

EXAMPLE 4

An oil-in-water emulsion was prepared by admixing 25 g the above-mentioned non-detergent motor oil with 200 g of water in a Waring Blender set at its highest mixing speed. Mixing time was 15 minutes. The resulting product was placed in a separatory funnel, allowed to stand for 8 hours with occasional gentle swirling to facilitate separation of large oil particles. About ¾ of the lower phase, a very hazy appearing emulsion of oil-in-water was removed from the funnel and recovered. Ten batches of the emulsion were prepared, combined, and designated "Emulsion 4A."

2. Reaction temperature was (a) 25°–30°C; (b) 40°–50°C; (c) 70°–80°C; (d) 80°–90°C; (e) 90°–98°C; (f) 100°–110°C; and 115°–125°C; a pressurized reaction vessel was used in runs (c) through (g).

3. The pH was adjusted to; (a) 1–1.5; (b) 2–3; (c) 3.5–4.5; (d) 6–6.9; and 7–7.5 to terminate reaction.

4. The dimethylaminopropylamine was replaced with; (a) ammonia; (b) methylamine; (c) ethylamine; (d) normalpropylamine; (e) diethylenetriamine; (f) triethylenetetramine; and (g) isopropylamine.

5. The dimethylamine was replaced with; (a) diethylamine; (b) di-n-propylamine; (c) di-isopropylamine; (d) di-n-butylamine; (e) methyl-n-propylamine; (f) methylisopropylamine; and (g) methylethylamine.

6. At least one run was made using each amine recited in item 4, supra, with each amine recited in item 5, supra.

7. Water was added to the reacting mixture when its viscosity reached; (a) 20 centipoises; (b) 100 centipoises; (c) 550 centipoises; (d) 1000 centipoises; (f) 5100 centipoises; (g) 10,200 centipoises; and (h) 25,000 centipoises and the resulting diluted mixtures were set aside for testing as emulsion breakers.

8. The equivalent ratio of epichlorohydrin to:
  a. dimethylaminopropylamine was; (i) 1:0.36; (ii) 1:0.27; (iii) 1:0.18, (iv) 1:0.13; (v) 1:0.063; and (vi) 1:0.045;
  b. dimethylamine was; (i) 1:0.63; (ii) 1:0.59; (iii) 1:0.56; (iv) 1:0.42; (v) 1:0.36; (vi) 1:0.33, and in each of these runs the equivalent ratio of epichlorohydrin to dimethylaminopropylamine plus dimethylamine was within the range of 1:0.36–1.

The demulsifying compositions made in the above runs was tested according to the general procedures of Examples 3 and 5 and each was found to be an excellent emulsion breaking composition.

EXAMPLE 6

In another run an emulsion comprising a salt brine dispersed in crude oil (naturally occurring petroleum) was treated at 65°–70°C with 500 ppm of Demulsifier No. 1A using the general procedure of Example 3. The emulsion broke and in 10 hours a clear haze free aqueous phase had separated.

As used herein the term "mole" has its generally accepted meaning —a mole of a substance being that quantity of the substance which contains the same number of molecules of the substance as there are carbon atoms in 12 g of pure $^{12}$C.

The functionality of each amine used in the present invention is equal to the number of reactive amino hydrogens per molecule thereof, that is, to the number of hydrogens which are attached to basic amino nitrogen atoms. Thus ethylenediamine has a functionality of 4, tetraethylenepentamine has a functionality of 7, dimethylamine has a functionality of 1, dimethylaminopropylamine has a functionality of 2, and ammonia has a functionality of 3.

The "equivalent weight" of an amine is the gram molecular weight of said amine divided by its functionality. Thus, an "equivalent" of ethylenediamine is ¼ mole of ethylenediamine, an "equivalent" of tetraethylenepentamine is 1/7 mole of tetraethylenepentamine, an "equivalent" of dimethylamine is 1 mole of dimethylamine, and an "equivalent" of dimethylaminopropylamine is ½ mole of dimethylaminopropylamine, and an "equivalent" of ammonia is ⅓ mole of ammonia.

Epichlorohydrin has a functionality of 2; hence, an equivalent of epichlorohydrin is ½ mole of epichlorohydrin.

As used herein the term "dihalohydrin" means a dihalogen substituted alkanol in which one of the halogens (the "first halogen") is substituted for a hydrogen on a carbon atom adjacent to the carbon atom having the OH group attached thereto and the other halogen (the "second halogen") is substituted for a hydrogen on; (a) a carbon atom adjacent to the carbon atom having the first halogen attached thereto; or (b) a carbon atom adjacent to the carbon atom having the OH group attached thereto; however, both halogen atoms cannot be on the same carbon atom, and a halogen atom cannot be on the carbon atom to which the OH group is attached.

Typical dihalohydrins include but are not limited to:

$CH_2ClCHClCH_2OH$
$CH_2ClCH_2(OH)CH_2Cl$
$CH_3CHClCHClCH_2OH$
$CH_3CHClCH(OH)CH_2Cl$
$CH_3CH_2CHClCHClCH_2OH$
$CH_3CHClCHClCH(OH)CH_3$
$CH_3CH_2CHClCH(OH)CH_2Cl$
$CH_3CH_2CH(OH)CHClCH_2Cl$
$CH_3CHClCH(OH)CHClCH_3$

and the bromo analogs of the above dichlorohydrins.

The functionality of the dihalohydrins is two; hence an equivalent of a dihalohydrin is ½ mole of the dihalohydrin.

Viscosity was determined at 25°C using a Brookfield Viscometer with a No. 2 spindle at 12 revolutions per minute.

pH was determined with a glass electrode type pH meter at 25°C.

As used herein, the term "percent (%)" means parts per 100 and the term "parts" means parts by weight unless otherwise defined where used.

I claim:

1. A process for demulsifying a water-in-oil or an oil-in-water emulsion which comprises subjecting the emulsion to the demulsifying action of an amount of demulsifying composition effective for demulsifying the emulsion and separating the resulting oil and water phases, the demulsifying composition being formed by: admixing and reacting at 25°–125°C i. a member selected from a first group consisting of ammonia, a primary alkylamine having 4–12 carbon atoms per molecule, and a alkylenepolyamine having 4–12 carbon atoms per molecule and 1–6 primary amino groups per molecule; (ii) a member selected from a second group consisting of a secondary alkyl amine having 2–8 carbon atoms and 1–6 secondary amino groups per molecule and a secondary alkylenepolyamine having 3–28 carbon atoms per molecule and at least 1 secondary amino group per molecule; (iii) a member selected from a third group consisting of an epihalohydrin and a dihalohydrin having 3–10 carbon atoms per molecule; and (iv) water to from a mixture, the equivalent ratio of third group member to first group member being 1:0.009–0.5 and the equivalent ratio of the third group member to first group member plus second group member being 1:0.22–1.3 and the mole ratio of third group member to water being 1:1–100.

2. A process for demulsifying a water-in-oil or an oil-in-water emulsion which comprises subjecting the emulsion to the demulsifying action of an amount of a demulsifying agent effective for demulsifying the emulsion and separating the resulting oil and water phases, the demulsifying composition being formed by:
  a. admixing (i) a member selected from a first group consisting of ammonia, a primary alkylamine having 4–12 carbon atoms per molecule, and an alkylenepolyamine having 4–12 carbon atoms per molecule and 1–6 primary amino groups per molecule; (ii) a member selected from a second group consisting of a secondary alkyl amine having 2–8 carbon atoms and 1–6 secondary amino groups per molecule and a secondary alkylenepolyamine having 3–28 carbon atoms per molecule and 2–15 secondary amino groups per molecule; (iii) a member from a third group consisting of epichlorohydrin, epibromohydrin, and a dihalohydrin having 3–10 carbon atoms per molecule; and (iv) water to form a mixture, the equivalent ratio of third group member to first group member being 1:0.02–0.5, the equivalent ratio of third group member to first group member plus second group member being 1:0.25–1, and the mole ratio of third group member to water being 1:2–50; and
  b. maintaining the mixture at 35°–125°C until its viscosity becomes 20–20,000 centipoises to form an aqueous solution of said demulsifying composition.

3. The process of claim 2 in which the first group member is dimethylaminopropylamine.

4. The process of claim 2 in which the second group member is dimethylamine.

5. The process of claim 2 in which the third group member is epichlorohydrin.

6. The process of claim 2 in which the third group member is epibromohydrin.

7. The process of claim 2 in which the emulsion is a water-in-oil emulsion.

8. The process of claim 2 in which the oil component of the emulsion is a petroleum oil.

9. The process of claim 2 in which the secondary alkylenepolyamine has 3–8 carbon atoms per molecule.

10. A process for breaking an oil-in-water or a water-in-oil emulsion comprising admixing with the emulsion an aqueous solution of a condensate of:
  a. a member selected from a first group consisting of ammonia, methylamine, ethylamine, normal propylamine, diethylenetriamine, triethylenetetramine, isopropylamine, and dimethylaminopropylamine;
  b. a member selected from a second group consisting of dimethylamine, diethylamine, di-n-propylamine, di-isopropylamine, di-n-butylamine, methyl-n-propylamine, methylisopropylamine, and methylethylamine; and
  c. a member selected from a third group consisting of epichlorohydrin, bromochlorhydrin, CH$_2$ClCHClCH$_2$OH, CH$_2$ClCH$_2$(OH)CH$_2$Cl, CH$_3$CHClCHClCH$_2$OH, CH$_3$CHClCH(OH)CH$_2$Cl, CH$_3$CH$_2$CHClCHClCH$_2$OH, CH$_3$CHClCHClCH(OH)CH$_3$, CH$_3$CH$_2$CHClCH(OH)CH$_2$Cl, CH$_3$CH$_2$CH(OH)CHClCH$_2$Cl, CH$_3$CHClCH(OH)CHClCH$_3$,

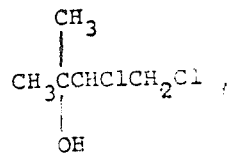

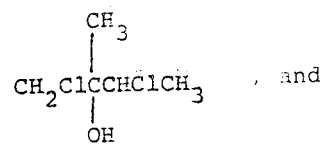

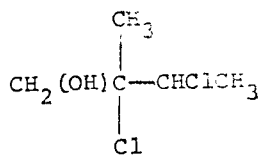

said condensate being prepared by admixing and reacting at 35°–100°C a member selected from the first group, a member selected from the second group, a member selected from the third group, and water, the equivalent ratio of third group member to first group member being 1:0.02–0.5, the equivalent ratio of third group member to first group member plus second group member being 1:0.25–1, and the mole ratio of third group member to water being 1:2–50.

11. The process of claim 10 in which the first group member is dimethylaminopropylamine.

12. The process of claim 10 in which the second group member is dimethylamine.

13. The process of claim 10 in which the third group member is epichlorohydrin.

14. The process of claim 10 in which the first group member is dimethylaminopropylamine, the second group member is dimethylamine, and the third group member is epichlorohydrin.

* * * * *

UNITED STATES PATENT AND TRADEMARK OFFICE
CERTIFICATE OF CORRECTION

PATENT NO. : 3,900,423

DATED : 19 August 1975

INVENTOR(S) : Sheldon B. Markofsky

It is certified that error appears in the above—identified patent and that said Letters Patent are hereby corrected as shown below:

In line 43 of column 8 change "i" to --(i)--.

In line 57 of column 8 change "from" to -- form--.

Signed and Sealed this fourth Day of May 1976

[SEAL]

Attest:

RUTH C. MASON
*Attesting Officer*

C. MARSHALL DANN
*Commissioner of Patents and Trademarks*